US011716665B2

(12) United States Patent
Triolo et al.

(10) Patent No.: US 11,716,665 B2
(45) Date of Patent: *Aug. 1, 2023

(54) DIRECTED HANDOVERS IN A CELLULAR NETWORK FOR AIRBORNE MOBILE TELEMETRY

(71) Applicant: PERSPECTA LABS INC., Basking Ridge, NJ (US)

(72) Inventors: Anthony A. Triolo, Basking Ridge, NJ (US); Achilles Kogiantis, Basking Ridge, NJ (US); Kiran M. Rege, Basking Ridge, NJ (US)

(73) Assignee: Peraton Labs Inc., Basking Ridge, NJ (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/072,538

(22) Filed: Oct. 16, 2020

(65) Prior Publication Data

US 2021/0112476 A1    Apr. 15, 2021

Related U.S. Application Data

(63) Continuation of application No. 16/041,465, filed on Jul. 20, 2018, now Pat. No. 10,813,029.

(Continued)

(51) Int. Cl.
*H04W 36/32*    (2009.01)
*H04W 36/08*    (2009.01)
(Continued)

(52) U.S. Cl.
CPC ............. *H04W 36/32* (2013.01); *H04B 7/01* (2013.01); *H04B 17/318* (2015.01);
(Continued)

(58) Field of Classification Search
USPC ........................................... 370/331
See application file for complete search history.

(56) References Cited

U.S. PATENT DOCUMENTS 8,688,108 B2 * 4/2014 Kaminski ............. H01Q 1/521
343/705
8,934,906 B2 * 1/2015 Pan ...................... H04W 36/32
455/436

(Continued)

OTHER PUBLICATIONS

Nokia "*4G LTE for Airports and Air-to-Ground*" https://networks.nokia.com/solutions/4g-lte-airports-and-air-ground, accessed Aug. 10, 2018.

(Continued)

*Primary Examiner* — Jeffrey M Rutkowski
*Assistant Examiner* — Luna Weissberger
(74) *Attorney, Agent, or Firm* — Heslin Rothenberg Farley & Mesiti P.C; George S Blasiak

(57) ABSTRACT

Methods, computer program products, and systems are presented. The method computer program products, and systems can include, for instance: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining.

20 Claims, 6 Drawing Sheets

Related U.S. Application Data

(60) Provisional application No. 62/535,454, filed on Jul. 21, 2017.

(51) Int. Cl.

| | | |
|---|---|---|
| *H04W 84/06* | (2009.01) | |
| *H04B 17/336* | (2015.01) | |
| *H04B 17/318* | (2015.01) | |
| *H04B 7/01* | (2006.01) | |
| *H04B 17/391* | (2015.01) | |

(52) U.S. Cl.
CPC ....... *H04B 17/336* (2015.01); *H04B 17/3913* (2015.01); *H04W 36/08* (2013.01); *H04W 84/06* (2013.01)

(56) References Cited

U.S. PATENT DOCUMENTS

| | | |
|---|---|---|
| 2006/0239238 A1 | 10/2006 | Femandez-Corbaton et al. |
| 2011/0002371 A1 | 1/2011 | Forenza et al. |
| 2011/0070841 A1 | 3/2011 | Caulfield |
| 2012/0081248 A1 | 4/2012 | Kennedy et al. |
| 2012/0289233 A1* | 11/2012 | Medbo .................... G01S 11/10 455/436 |
| 2016/0345222 A1* | 11/2016 | Axmon ................. H04W 36/04 |
| 2017/0111771 A1 | 4/2017 | Haque et al. |
| 2017/0127332 A1 | 5/2017 | Axmon et al. |
| 2017/0171792 A1* | 6/2017 | Axmon ................. H04W 84/06 |

OTHER PUBLICATIONS

SmartSky Networks "*SmartSky Networks Brings 4G LTE-Based Connectivity to Commercial Airlines*" http://smailskynetworks.com/conunercial-aviation/4g-commercial-airline-inflight-connectivity/, accessed Aug. 10, 2018.

GoGo Commercial Aviation, *Next Generation Air-to-Ground* (*ATG*) https://www.gogoair.com/commercial/atg4, accessed Aug. 10, 2018.

Non-Final Rejection dated Aug. 6, 2019.

Response to Non-Final Rejection, U.S. Appl. No. 16/041,465, filed Jul. 20, 2018, dated Dec. 6, 2019.

Final Rejection, U.S. Appl. No. 16/041,465, filed Jul. 20, 2018, dated Feb. 19, 2020.

Response to Final Rejection, U.S. Appl. No. 16/041,465, filed Jul. 20, 2018, dated May 19, 2020.

Petition to Remove Finality, U.S. Appl. No. 16/041,465, filed Jul. 20, 2018, dated May 19, 2020.

Decision on Petition, U.S. Appl. No. 16/041,465, filed Jul. 20, 2018, dated Jul. 17, 2020.

Notice of Allowance and Fees Due, U.S. Appl. No. 16/041,465, filed Jul. 20, 2018, dated Jul. 24, 2020.

\* cited by examiner

DIRECTED HANDOVERS IN A CELLULAR NETWORK FOR AIRBORNE MOBILE TELEMETRY

CROSS-REFERENCE TO RELATED APPLICATION

This application is a continuation to U.S. patent application Ser. No. 16/041,465 filed Jul. 20, 2018, entitled "Directed Handovers in a Cellular Network for Airborne Mobile Telemetry" which is incorporated by reference herein in its entirety, which claims priority to U.S. Provisional Application No. 62/535,454 filed Jul. 21, 2017, entitled "Directed Handovers in a Cellular Network for Airborne Mobile Telemetry" which is incorporated by reference herein in its entirety.

GOVERNMENT RIGHTS STATEMENT

This invention was made with U.S. Government support under Agreement No. W15QKN-15-9-1004 awarded by the ACC-NJ to the NSC. The U.S. Government has certain rights in this invention.

FIELD OF THE INVENTION

The present disclosure relates to mobile wireless networks, and in particular to wireless networks with mobile airborne user devices.

BACKGROUND

A cellular network can be characterized by multiple base stations arranged in a cellular pattern. Handoff schemes for handing off mobile articles within a cellular network have included sensing signal strength. According to one known handoff method, a mobile network can be connected to a first base station having a highest signal strength and can be handed off to a second base station based on a signal strength of the second base station exceeding a signal strength of the first base station.

BRIEF DESCRIPTION

Methods, computer program products, and systems are presented. The methods, computer program products, and systems can include, in one embodiment, for instance: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining. The methods, computer program products, and systems can include, in one embodiment, for instance: predicting a future a location of a mobile airborne article; examining using the predicted future location one or more parameter characterizing a prospective connection of the mobile airborne article to first through Nth base stations; determining based on the examining that a criterion is satisfied, the criterion having one or more factor; initiating handoff of the mobile airborne article to one of the first through Nth base stations based on the determining.

SUMMARY

Shortcomings of the prior art are overcome, and additional advantages are provided, through the provision, in one aspect, of a method. The method can include, for example: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining.

In another aspect, a computer program product can be provided. The computer program product can include a computer readable storage medium readable by one or more processing circuit and storing instructions for execution by one or more processor for performing a method. The method can include, for example: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining.

In a further aspect, a system can be provided. The system can include, for example a memory. In addition, the system can include one or more processor in communication with the memory. Further, the system can include program instructions executable by the one or more processor via the memory to perform a method. The method can include, for example: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining.

Shortcomings of the prior art are overcome, and additional advantages are provided, through the provision, in one aspect, of a method. The method can include, for example: predicting a future location of a mobile airborne article; examining using the predicted future location one or more parameter characterizing a prospective connection of the mobile airborne article to first through Nth base stations; determining based on the examining that a criterion is satisfied, the criterion having one or more factor; and initiating handoff of the mobile airborne article to one of the first through Nth base stations based on the determining.

In another aspect, a computer program product can be provided. The computer program product can include a computer readable storage medium readable by one or more processing circuit and storing instructions for execution by one or more processor for performing a method. The method can include, for example: predicting a future location of a mobile airborne article; examining using the predicted future location one or more parameter characterizing a prospective connection of the mobile airborne article to first through Nth base stations; determining based on the examining that a criterion is satisfied, the criterion having one or more factor; and initiating handoff of the mobile airborne article to one of the first through Nth base stations based on the determining.

In a further aspect, a system can be provided. The system can include, for example a memory. In addition, the system can include one or more processor in communication with the memory. Further, the system can include program instructions executable by the one or more processor via the memory to perform a method. The method can include, for example: predicting a future location of a mobile airborne article; examining using the predicted future location one or more parameter characterizing a prospective connection of the mobile airborne article to first through Nth base stations; determining based on the examining that a criterion is satisfied, the criterion having one or more factor; and initiating handoff of the mobile airborne article to one of the first through Nth base stations based on the determining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: examining one or more parameter characterizing a prospective connection of a mobile airborne article to first through nth base stations, the one or more parameter including a Doppler shift; determining based on the examining that a criterion is satisfied, the criterion having one or more factor; and initiating handoff of the mobile airborne article to one of the first through nth base stations based on the determining. Other embodiments of this aspect include corresponding computer systems, apparatus, and computer programs recorded on one or more computer storage devices, each configured to perform the actions of the methods.

One general aspect includes a method including: predicting a future location of a mobile airborne article; examining using the predicted future location one or more parameter characterizing a prospective connection of the mobile airborne article to first through nth base stations; determining based on the examining that a criterion is satisfied, the criterion having one or more factor; and initiating handoff of the mobile airborne article to one of the first through nth base stations based on the determining. Other embodiments of this aspect include corresponding computer systems, apparatus, and computer programs recorded on one or more computer storage devices, each configured to perform the actions of the methods.

One general aspect includes a computer program product including: a computer readable storage medium readable by one or more processing circuit and storing instructions for execution by one or more processor for performing a method including: examining one or more parameter characterizing a prospective connection of the mobile airborne article to first through nth base stations, the one or more parameter including a Doppler shift; determining based on the examining that a criterion is satisfied, the criterion having one or more factor; and initiating handoff of the mobile airborne article to one of the first through nth base stations based on the determining. Other embodiments of this aspect include corresponding computer systems, apparatus, and computer programs recorded on one or more computer storage devices, each configured to perform the actions of the methods.

Figure 1:
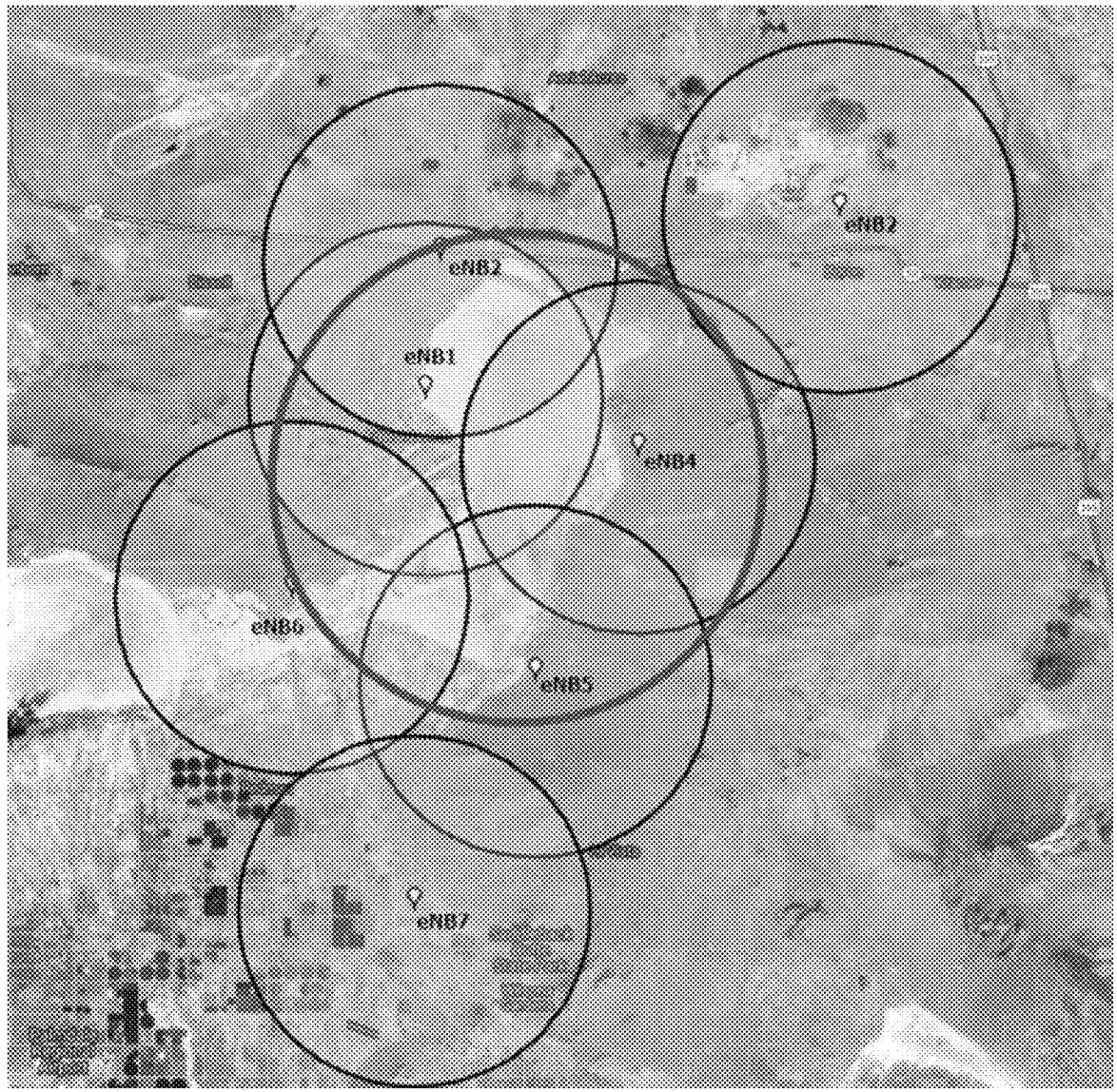
FIG. 1 is a schematic of a cellular range telemetry network according to one embodiment.

Implementing Directed Handovers in a Cellular Network for Airborne Mobile Telemetry. A Cellular Range Telemetry Network (CeRTN) comprises cellular network infrastructure supporting airborne mobile telemetry. Specifically, there is set forth herein, in one embodiment, an airborne mobile telemetry system using a cellular network based on the $3^{rd}$ Generation Partnership Project's (3GPP) Long-Term Evolution (LTE) or LTE-Advanced (LTE-A) standard. Thus, in departure from the current systems where dedicated antennas tracking individual Mobile Airborne Articles (AAs) support airborne telemetry, a cellular network comprising multiple base stations organized in a cellular pattern would be used to communicate with the airborne AA's. Embodiments herein can be based on easily available COTS components, which will lead to substantial reduction in the cost of building and operating the telemetry system. FIG. 1 shows a schematic of a CeRTN system supporting airborne range telemetry. An AA as set forth herein can be provided in one embodiment by a user equipment (UE) device e.g. an LTE UE device carried by an aircraft. A UE device as set forth herein can be provided e.g. by a portable hand held transceiver equipped computer system with an antenna link, or an aircraft installed transceiver equipped computer system with an antenna link.

The exemplary CeRTN shown in FIG. 1 comprises 7 base stations (eNodeBs or eNBs) supporting communication based on the LTE-A standard. The figure also shows the coverage areas associated with each of these base stations. When an AA goes on a flight following a certain (predetermined) flight path, it moves from the coverage area of one base station to that of another. For instance, if an AA follows the flight path represented by the circle, indicated with a thickened line, in FIG. 2, it will move from the coverage area of eNB1 to that of eNB6, and so on. In contrast to the current systems where the AA would have a (ground-based) antenna tracking it throughout its flight, in a CeRTN, the AA will be handed over from one base station to another as its position moves between the corresponding coverage areas. In order to ensure that the communication link between the AA and the telemetry stations on the ground remains strong enough to support the desired data rates, the AA can be connected to the base station with which it can maintain a good-quality link. Moreover, as the quality of this link deteriorates due to the movement of the AA, the latter can be quickly handed over to another base station that is now able to provide the desired link.

Embodiments herein recognize that typical speeds associated with AAs can be more than an order of magnitude larger than the speeds encountered in ordinary cellular networks. Embodiments herein recognize that this difference in mobility characteristics has various implications including: 1. Features can be advantageously implemented to proactively effect handovers in order to avoid potential link failure caused by typical delays in the handover process; and 2. A handover criterion can advantageously include a Doppler shift factor. Embodiments herein recognize that since the speeds at which the AA's move can introduce very high Doppler shifts in the received signal, well beyond the capability of COTS LTE equipment, the normal handover criterion based on received signal strength or received signal quality are no longer adequate. In other words, the system logic driving handovers can be such as to ensure that the AA's are connected to base stations that can not only provide communication links with an adequate level of signal strength but a manageable level of Doppler as well.

Figure 2:
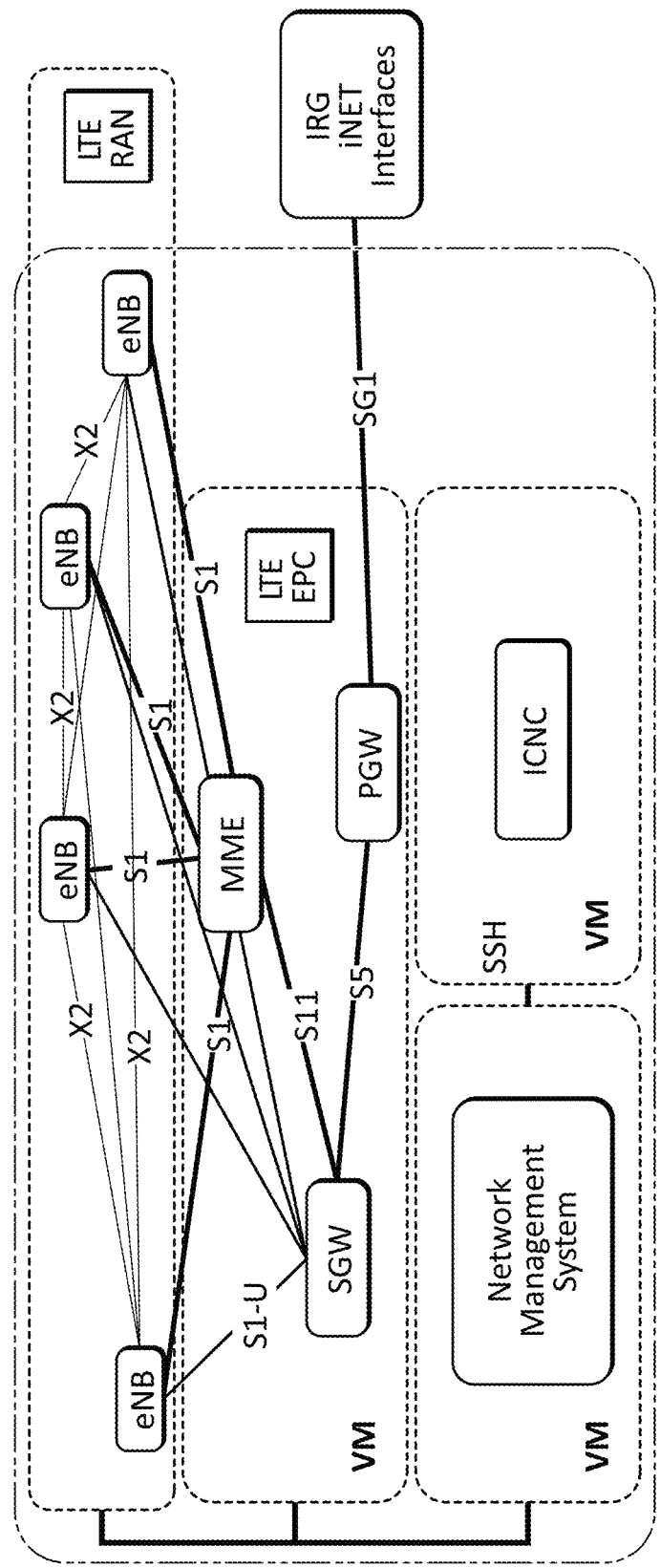
FIG. 2 depicts a CeRTN Architecture according to one embodiment.

Proposed System Architecture and Elements. There is proposed in one embodiment the following architecture for CeRTN that is also supported by a relatively dense deployment of base stations so that most of the points on the likely flight paths of the AAs are within the coverage areas of multiple base stations; moreover, the lines of sight to these base stations are nearly perpendicular to the AA Heading. FIG. 2 shows an illustration of this architecture.

As shown in FIG. 2, the eNBs in CeRTN are interconnected with the X2 interfaces (when available) and each eNB is connected to the MME through an S1 interface on the control plane and to the SGW with a S1-U interface on the user plane. The group of eNBs comprises the LTE RAN, while the rest of the functional elements other than the Network Management System and ICNC comprise the LTE Evolved Packet Core (EPC). The LTE RAN and the LTE EPC together are referred to as the LTE network.

It should be highlighted that the interfaces are IP based and are logical. That is, no direct eNB-eNB physical connection is required. The control plane's physical connection links can be routed through the MME, if the MME is located at a central location. The X2 interface implies that packets originating in one eNB terminate at another eNB without the MME processing these packets.

The Evolved Packet Core provides data to external elements, like the existing range telemetry system, through the SGi interface. The entire LTE network is managed through the Network Management System (NMS). Each vendor calls this system something different, since it is not a standardized element. However, the functionality remains the same, that is, manage parameters and settings on all of the LTE network elements.

As far as this invention is concerned, the key element of the proposed CeRTN system is the Integrated Cellular and Network Controller, or ICNC for short. The ICNC interacts with the elements of the LTE network to actively force handoffs to desired eNodeBs, the mechanism to do so is through the Network Management System. Parameters of the LTE network can be modified in real-time through the interface to the NMS.

Physically, the EPC, the NMS, and the ICNC in one embodiment can be collocated on the same server, with each element existing within its own Virtual Machine.

Figure 3:
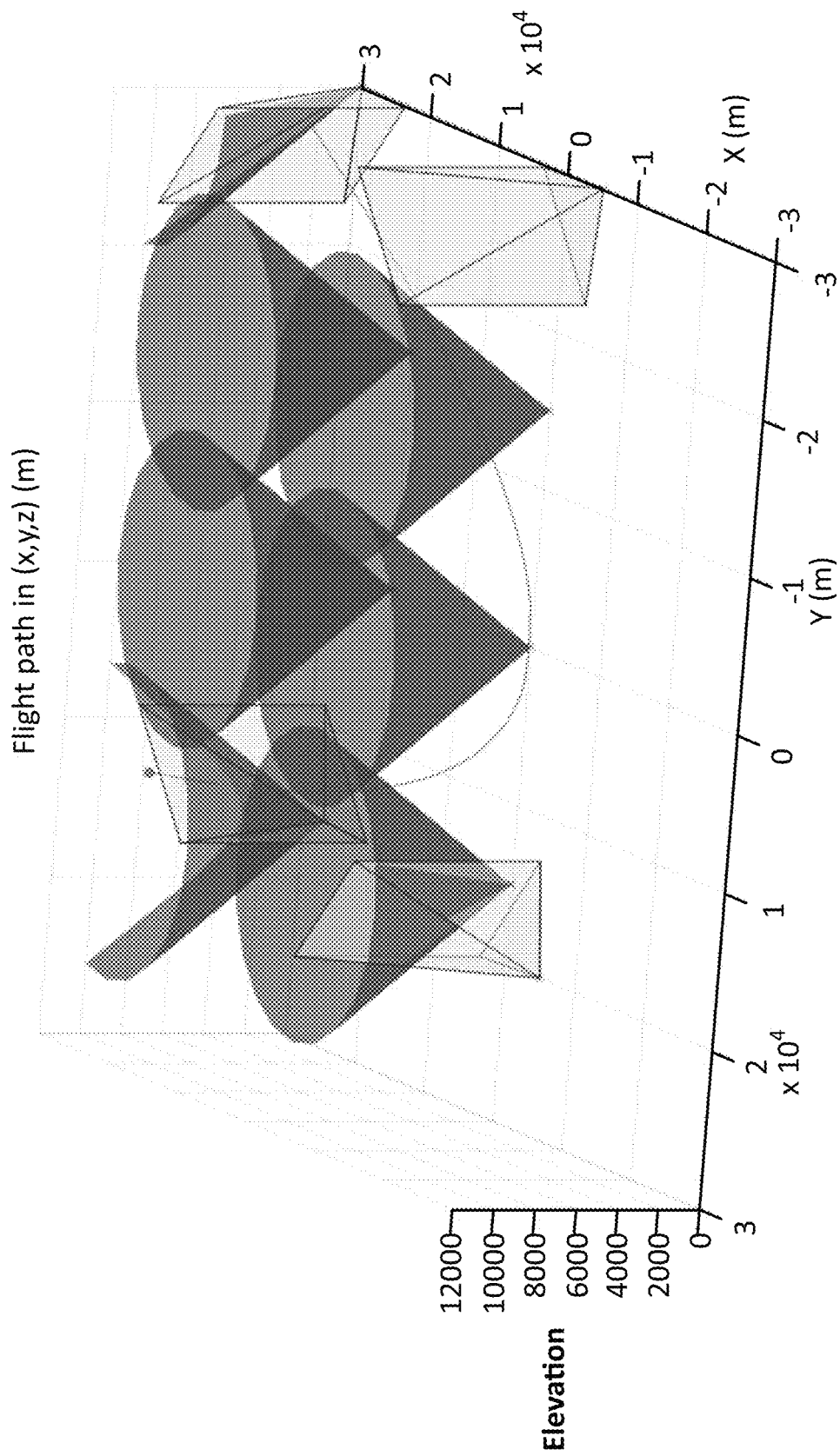
FIG. 3 is an illustration of a 3-D coverage map of the area according to one embodiment.

Proposed Scheme for Handover Control. We now describe how the proposed scheme exercises handover control to enable the AA to connect to a base station (eNB) that provides a communication link that not only has a high SINR, but also a manageable Doppler. To that end, we assume that an LTE network providing coverage to the site has been designed and implemented, and a coverage map of the entire LTE network has been prepared. Note that since the AAs making use of CeRTN are mostly airborne, the LTE network must be designed to provide good coverage at all the altitudes at which the AA's are likely to fly within an area. Also, the coverage map of the area will have to be 3-dimensional as shown in FIG. 3 by way of an illustration.

We describe the proposed scheme by outlining the message and control flow within the system as an AA takes off and follows its flight path: Accordingly, before an AA begins its take-off run, it establishes a connection with the LTE network using standard LTE procedures. For example, it establishes connection with the base station with the strongest received signal strength (RSSI). The base station connected to the AA is referred to as its serving base station. The AA also receives a list of neighboring base stations from the serving base station. The AA periodically measures the RSSI associated with each of the base stations in the neighbor list and reports them to the serving base station. The reporting period may be set at a suitable level such as a period in the range of from about 0.5 to 3 seconds, e.g. 1 second. The RSSI measurements are received by the serving base station and forwarded to ICNC via the NMS. In an alternative embodiment, the AA is equipped with a GPS receiver, and periodically measures its 3-D coordinates using the GPS receiver and reports them to the serving base station. The serving base station forwards the AA's 3-D position coordinates to ICNC via the NMS.

Location Estimation. If position coordinates based on GPS measurements are not available, ICNC uses the RSSI measurements reported by the AA to estimate its location. Additionally, if position coordinates based on GPS measurements are not available, ICNC may use (in addition to the RSSI) the timing advance reported by the AA to estimate its location (the timing advance can be reported by an AA's serving base station).

To that end, it uses a triangulation method in conjunction with a suitable path-loss model to estimate the AA's location. For most of the locations on a AA's flight-path that are at fairly high altitudes, a free-space model of path-loss works well. Alternatively, other suitable models such as the Gierhart-Johnson propagation model may be used for these locations. For points close to the ground the Irregular Terrain Model may be used to estimate the path loss to base stations on the neighbor list. Since a 3-D location estimate is sought, RSSI measurements associated with a minimum of four base stations are required. Note that if location measurements are available (via the GPS system), the current step involving location estimation can be implemented via GPS.

Location Prediction. Once an estimate of the AA's current location is calculated, ICNC proceeds to predict the AA's location at a suitable point in time in the future. For example, if the current time is t seconds, ICNC predicts the AA's location at t+τ seconds, where τ is a suitable prediction horizon, e.g. 2 seconds. Different methods can be used for location prediction. For example, one practical type of location prediction algorithm is based on "spline" functions. Due to kinematic constraints, the path between discrete samples of a flight-path is generally not a straight line. A common way to model the flight trajectory is a $3^{rd}$ order spline function, which is a piece-wise cubic parameterized function of time. Since ICNC does not have access to actual points on the flight-path, it uses the predicted AA locations in their place. Thus, given the most recent location estimates, say the current one as well as the past three estimates, ICNC can fit a $3^{rd}$ order spline function to model the trajectory followed by the AA over the most recent segment of its flight-path, and assuming that its speed does not change significantly over the prediction horizon, it uses a continuation of the spline function to predict the locations the AA is likely to pass through in the immediate future.

While spline functions provide one way to model segments of the trajectory followed by an AA, they are, by no means, the only way to model the flight-paths. For instance, since the turning maneuvers of AA's usually follow a circular path, one can use a circular path prediction method to model segments of flight paths. In this method, ICNC selects the most recent location estimates for an AA and fits a circle to these points to model the path followed by the AA. In order to predict the AA's location at time t+τ, it uses a continuation of this circle with the additional assumption that the speed of the AA does not change much from its current value.

Determining the Best Base station to Hand over to. After the previous step, ICNC has an estimate not only of the location of the AA at time t+τ, but also its velocity. The latter is obtained as follows: First, the speed of the AA at time t is obtained by simply dividing the distance traversed between the previous two location estimates by the difference in the corresponding reporting times. Assuming that the speed of the AA remains constant between times t and t+τ, it also gives an estimate of the AA's speed at time t+τ as well. The direction of the AA's velocity is given by the direction of growth for the predicted flight-path at time t+τ. With the estimated magnitude (speed) and the direction of the AA's velocity, we have a complete characterization of the latter (the velocity). Using this velocity estimate, ICNC computes the Doppler shift that signals from the AA are likely to experience at each of the base stations in the neighbor list. The Doppler shift for a base station is computed by simply projecting the predicted velocity along the position vector between that base station and the AA's predicted location, dividing it by the speed of light and multiplying the result by the carrier frequency. Also, given the AA's predicted location at time t+τ and the coverage maps of each of the base stations on the neighbor list, ICNC can compute an estimate of signal strength, e.g. a signal to interference plus noise (SINR) value associated with each of those base stations at time t+τ. Thus, at this stage, ICNC has, for each base station on the neighbor list, an estimate of the SINR and the Doppler shift the AA is likely to experience if it is handed over to that base station. Using the same method, ICNC can also compute estimates of these quantities if it remains connected to its current serving base station. Among all these base stations, ICNC can select the best base station for the AA at time t+τ as follows:

First, it can shortlist all those base stations for which the Doppler shift is within a certain threshold (say, 100 Hz). Among these shortlisted base stations, it can select the base station with the largest SINR value as the best base station for the AA to be connected to at time t+τ. If no base station is found on the shortlist (associated with a 100 Hz Doppler), ICNC relaxes the Doppler requirement (to, say 150 Hz) and repeats the process. This process can be continued until ICNC finds a base station that it considers to be the best base station for the AA to be connected to at time t+τ. Accordingly, a criterion for determining selection of a certain base station to which handoff can be initiated can include the criterion that a prospective connection of the mobile airborne article to the certain base station of the first through Nth base stations is characterized by having a Doppler shift parameter of within a threshold, and a highest signal strength of prospective connections having Doppler shifts of the within the threshold. ICNC can then initiate handoff of the AA to the certain base station.

In some embodiments, ICNC can initiate handoff based on a Doppler shift criterion and/or signal strength criterion without determination of predicted location of an AA at a future time. For example, ICNC can examine real time Doppler shifts and/or signal strength parameters between an AA and a plurality of candidate base stations to which the AA can connect. ICNC can select a certain base station of the plurality of candidate base stations e.g. based on a real time Doppler shift of the AA in respect to the certain base station being within a threshold and a signal strength of the certain base station to the AA having the highest value among candidate base stations providing real time Doppler shifts in reference to the AA within the threshold. Accordingly, a criterion for determining selection of a certain base station to which handoff can be initiated can include the criterion that a prospective connection of the mobile airborne article to the certain base station of the first through Nth base stations is characterized by having a Doppler shift parameter within a threshold, and a highest signal strength of prospective connections having Doppler shifts within the threshold.

If the selected base station is the same as the AA's current serving base station, connection of the AA can advantageously remain with the current serving base station. This means that ICNC can refrain from initiating a handover. On the other hand, if the selected base station is different from the AA's serving base station, a handover can be initiated.

Embodiments herein recognize that the Doppler shift between an AA (at current or predicted future location) can be in dependence on a spatial relationship between the base station and the AA. Accordingly location and direction information of an AA (current or predicted location) can be used as a measurement of Doppler shift (alternatively Doppler shift measurement can include comparing observed frequencies of received radio signals). For example, a perpendicularity dissimilarity score for a location and direction of an AA in respect to a plurality of candidate base stations can be examined and used as a surrogate measurement of Doppler shift. Embodiments herein recognize that locations and directions that are more perpendicular in respect to a base station tend to produce smaller Doppler shifts. In the case of a mobile AA provided by an aircraft an aircraft Heading parameter can be used for the providing of a perpendicularity dissimilarity score. In one embodiment, ICNC can determine a perpendicularity dissimilarity score based on a measurement of a first angle and can select a candidate base station for initiating connection to based on the measurement of a first angle, wherein the first angle is the angle between the Heading parameter for the AA and the candidate base station.

Accordingly, there is set forth herein, in one embodiment, methods, computer program products and systems including: predicting a future location of a mobile airborne article; examining using the predicted future location one or more parameter characterizing a prospective connection of the mobile airborne article to first through Nth base stations; determining based on the examining that a criterion is satisfied, the criterion having one or more factor; initiating handoff of the mobile airborne article to one of the first through Nth base stations based on the determining. There is also set forth herein, in one embodiment, methods, computer program products and systems including: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining.

Effecting Handovers. In those systems where blind handover commands (to hand over a specific UE to a specific base station independent of any measurement reports) can be sent to base stations from the NMS, ICNC can simply send a directive to the NMS to issue the desired blind handover command. In those cases where the interface between the NMS and the base stations does not allow such commands, ICNC sends directives to the NMS to change handover parameters such as thresholds, biases and hysteresis values. Specifically, ICNC changes these parameters in such a manner that the desired handover will happen naturally through the normal measurement reporting process. Conflicting handover requirements in the case of multiple AA's being on their respective flight-paths at the same time are handled by assigning the AA's to different classes and crafting the handover parameters for each class to effect the desired handovers.

Figure 4:
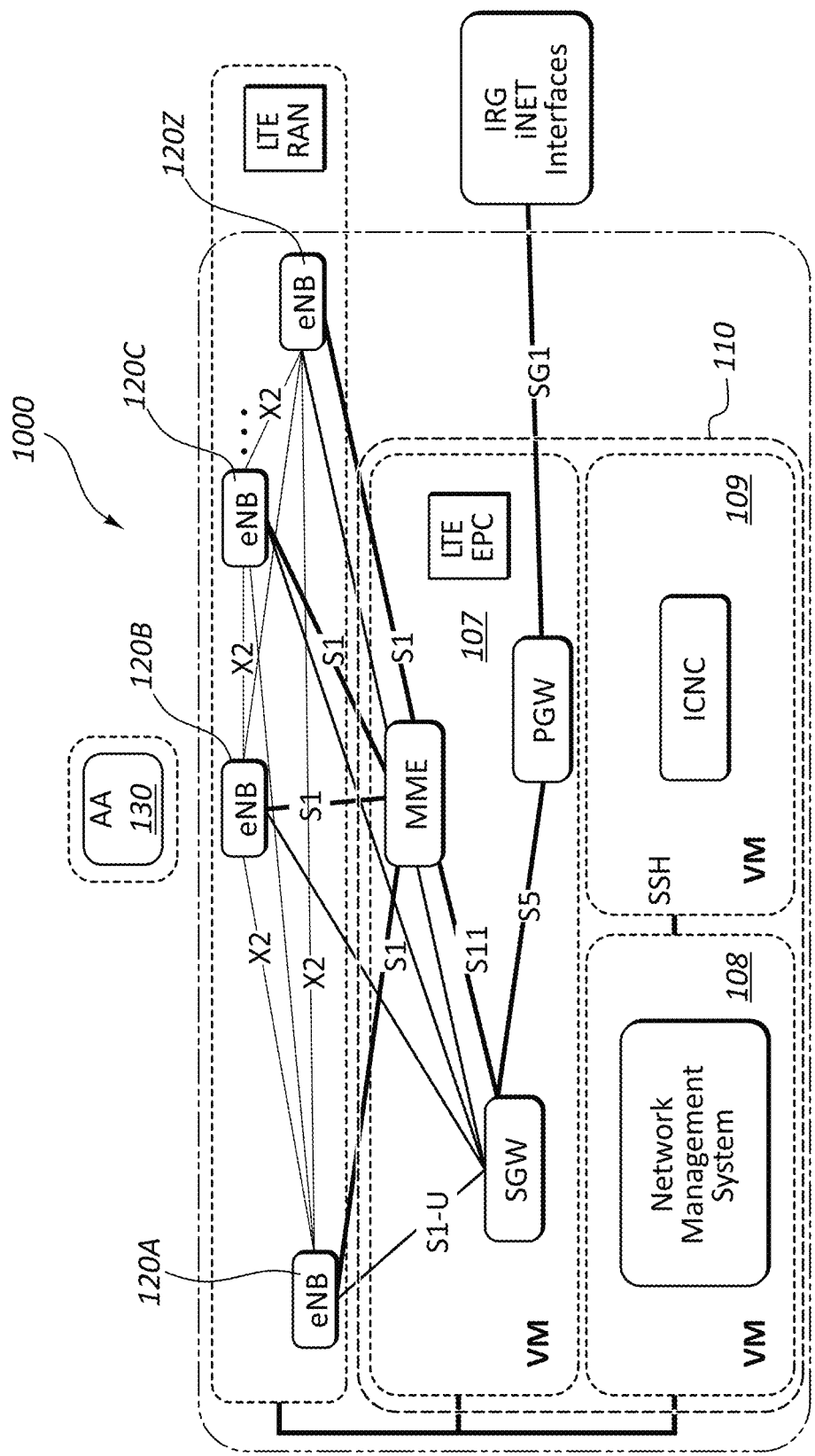
FIG. 4 is a schematic of a cellular range telemetry network according to one embodiment according to one embodiment.

Referring to FIG. 4, system 1000 can include an AA 130 in communication with a plurality of base stations 120A-120Z. The plurality of base stations 120A-120Z can be in communication with a manager system 110 defined by EPC 107 in combination with an MS 108 and ICNC 109. System 1000 describes a system set forth in reference to FIGS. 1-3 and the accompanying description hereinabove. Methods described in connection with FIGS. 1-3 can be performed together with methods described in connection with FIGS. 4 and 5.

Figure 5:
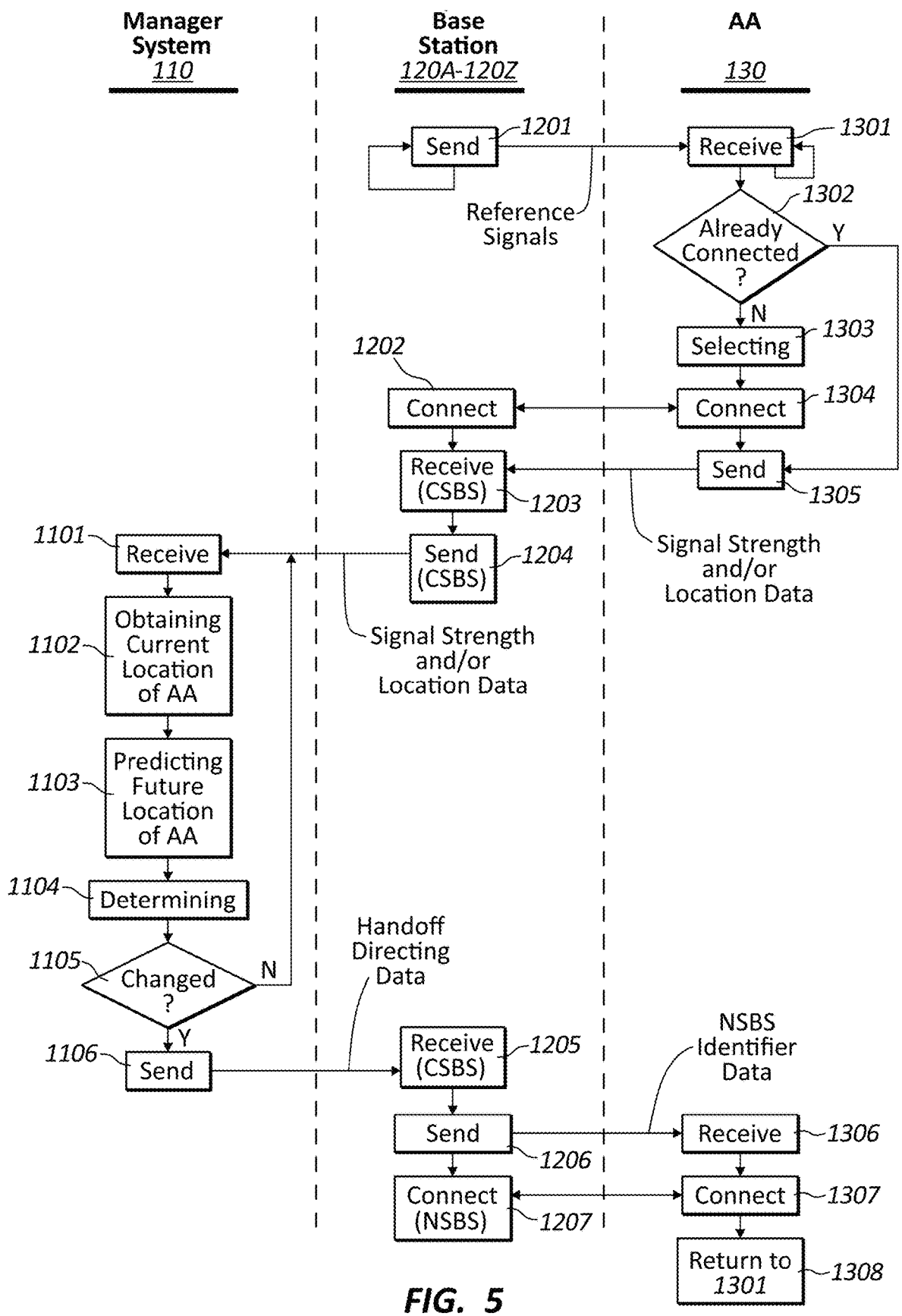
FIG. 5 is a flowchart depicting a method according to one embodiment.

A method for performance by manager system 110 interoperating with base stations 120A-120Z and AA 130 is set forth in reference to the flowchart of FIG. 5. At block 1201, base stations 120A-120Z can be iteratively (e.g. periodically) sending reference signals to AA 1300 for receipt by AA 130 at block 1301. On receipt of the reference signals AA 130 can proceed to block 1302 and determine whether AA 130 is currently connected to a base station. If AA 130 is not currently connected to a base station, AA 130 can proceed to block 1303 to initially connect to an initial base station of base stations 120A-120Z. At block 1303 AA 130 can perform selecting the of a base station of base stations 120A-120Z to which AA 130 can initially connect. For selecting a base station to which AA 130 is to initially connect, AA 130 can examine the received reference signals received at block 1301 to identify a base station having the highest signal strength. The signal strength can be indicated, e.g. in terms of received signal strength (RSSI) or can be indicated in terms of signal to interference+noise (SINR).

AA 130 can initiate a connection to a selected base station of base stations 120A-120Z selected at block 1303. The selected base station can be, e.g. the base station having the highest signal strength. At blocks 1304 and 1202 AA 130 and the selected base station can be sending communications to facilitate the connection of AA 130 to the selected base station of base stations 120A-120Z. Connecting blocks 1304 and 1202 can be performed according to one embodiment while AA 130 is on the ground prior to AA 130 becoming airborne.

On completion of a connection at block 1202, the connected base station of base stations 120A-120Z can define the currently serving base station (CSBS). The CSBS of base stations 120A on being connected to AA 130 can iteratively determine a timing advance parameter that is iteratively shared with AA 130 and AA 130 transmits data to the CSBS at times based on the shared timing advance parameter. The CSBS can iteratively determine a timing advance parameter and can iteratively share each iteratively determined timing advance parameter with AA 130. An iteratively determined timing advance parameter determined by the CSBS can be in dependence on a current distance of the AA 130 to the CSBS and the signal strength of received signals received by the CSBS from AA 130.

The CSBS determines and shares a timing advance parameter so that data received by the CSBS from AA 130 is received during valid listening periods of the CSBS. AA 130 can iteratively send data to the CSBS using a most recently shared timing advance parameter received from AA 130 so that received data received by the CSBS from AA 130 is received at valid listening windows of the CSBS.

AA 130 at block 1305 can send various data for receipt by the CSBS at block 1203. The various data can include, e.g. signal strength data determined by examining received referenced signals received from the base stations received by AA 130 at block 1301 and/or location data, e.g. as may be provided by a GPS device incorporated within AA 130. At send block 1204 the CSBS of base stations 120A-120Z can send, i.e., forward, the received data received at block 1203 to manager system 110 for receipt by manager system 110 at block 1101. The forwarded data, forwarded at block 1204 can include, e.g. signal strength data and/or GPS output location data which has been sent by AA 130 at block 1305.

On receipt of the data received at block 1101, manager system 110 can proceed to block 1102 to perform obtaining of a current location of AA 130. Obtaining at block 1102 by manager system 110 can include processing of signal strength data of the various base stations based on received reference signals received from the base stations 120A-120Z at block 1301. Manager system 110 performing locating at block 1102 can include manager system 110 processing of signal strength data received at block 1101 using a triangulation method.

Manager system 110 for performing locating of AA 130 at block 1103 can employ a triangulation method based on received signal strength data in conjunction with a suitable path loss method. For locations on a flight path of AA 130 that are at fairly high altitudes, e.g. altitudes higher than a threshold, manager system 110 can employ a free space model of path loss. Manager system 110 can alternatively employ a Gierhart-Johnson propagation model for modeling path loss. For points close to the ground, manager system 110 can employ a regular terrain model to estimate path loss.

According to one embodiment, the CSBS in addition to iteratively sharing an iteratively determined timing advance parameter with AA 130 as set forth herein can iteratively share the iteratively determined timing advance parameter to manager system 110. At block 1204 the CSBS of base stations 120A-120Z can send to manager system 110 for receipt by manager system 110 at block 1102 a most recently determined timing advance parameter.

Manager system 110 for performing locating of AA 130 at block 1102 can use a most recently received timing advance parameter received at block 1101. Manager system 110 using a received timing advance parameter can include manager system 110 determining an initial estimate of location based on the received timing advance parameter. Manager system 110 according to one embodiment can employ a gradient search method using signal strength data to generate a more accurate estimate of the AA location starting from an initial estimate provided based on the received timing advance parameter. In that the timing advance parameter is only indicative of the distance of the AA from the base station, with no indication of the direction, manager system 110 can try multiple initial estimates, and more accurate estimates of AA location can be derived starting from each of these initial estimates using the gradient search method. Among these more accurate estimates, manager system 110 can select based on signal strengths the estimate that minimizes an objective function as the obtained current location of AA 130 obtained at block 1102.

Where received data received at block 1101 includes GPS output location data manager system 110 obtaining a current location of AA 130 at block 1102 can include manager system 110 obtaining the received GPS output location data received at block 1101. Where GPS output location data is obtained at block 1102, manager system 110 can return a current location for AA 130 without use of signal strength data.

Manager system 110 at block 1103 can perform predicting a future location of AA 130. Predicting a future location of AA 130 at block 1103 can include use of a "spline" function as set for herein. Embodiments herein recognize that due to kinematic constraints, the path between discrete samples of a flight-path is generally not a straight line. A common way to model the flight trajectory is a $3^{rd}$ order spline function, which is a piece-wise cubic parameterized function of time. If manager system 110 does not have access to actual points (e.g. provided by GPS output location data) on a flight path of AA 130, it can use estimated AA locations in their place (e.g. provided using signal strength data). Thus, given the most recent location estimates, e.g. the current one as well as the past three estimates, manager system 110 can fit a $3^{rd}$ order spline function to model the trajectory followed by the AA 130 over the most recent segment of its flight-path, and assuming that its speed does not change significantly over the prediction horizon, it uses a continuation of the spline function to predict the locations the AA 130 is likely to pass through in the immediate future. A flight trajectory of AA 130 can be modeled using a third order spline function, which is a piecewise cubic parameterized function of time. Manager system 110 for performing predicting a future location of AA 130 at block 1103 can according to another embodiment use a circular path prediction method as set forth herein. Embodiments herein recognize that since the turning maneuvers of an AA often follow a circular path, manager system 110 can use a circular path prediction method to model segments of flight paths. Manager system 110 employing a circular path prediction method can select the most recent location estimates for AA 130 and can fits a circle to these points to model the path followed by the AA 130. In order to predict the location of AA 130 at time t+τ, manager system 110 can use a continuation of this circle with the additional assumption that the speed of AA 130 does not change much from its current value. On completion at block 1103, manager system 110 can proceed to block 1104. Other methods may also be used for location prediction.

Manager system 110 at block 1104 can perform determining that a criterion has been satisfied. Determining that a criterion has been satisfied at block 1104 can include manager system 110 determining that a criterion has been satisfied that triggers the handoff of a connection of AA 130 from a CSBS of base stations 120A-120Z to a next serving base station (NSBS). Performing determining at block 1104 can include manager system 110 examining one or more parameter. The one or more parameter can include, e.g. one or more signal strength parameter as set forth herein, e.g. RSSI based or SINR based. The one or more parameter examined at block 1104 can include a Doppler shift parameter as set forth herein. The one or more parameter examined at block 1104 can include a signal strength parameter and/or a Doppler shift parameter as set forth herein. The Doppler shift parameter herein refers to Doppler shift that signals from the AA are likely to experience at a candidate base stations such as candidate base stations specified in a neighbor list of base stations.

Manager system 110 determining a Doppler shift parameter for an AA to base station connection can include in one embodiment manager system 110 determining a perpendicularity dissimilarity parameter. Embodiments herein recognize that a Doppler shift for an AA to base station connection can be in dependence on perpendicularity, with lower perpendicular dissimilarities being indicative of smaller Doppler shifts. Manager system 110 can use a Heading parameter for providing of a perpendicularity dissimilarity score. In one embodiment, manager system 110 can determine a perpendicularity dissimilarity score based on a measurement of a first angle and can select a candidate base station for initiating connection to based on the measurement of a first angle, wherein the first angle is the angle between the Heading parameter for the AA (the direction in which the AA 130 is traveling) and the candidate base station (the vector pointing from the candidate base station to the AA 130). The closer the described first angle is to 90 degrees, i.e. when these two vectors are nearly perpendicular, its cosine is close to zero. Thus, the perpendicular dissimilarity score will be low.

Manager system 110 can calculate the first angle for each of a plurality of base stations and can select a next base station from a set of candidate base station based on the which candidate base station yield the lowest perpendicularity dissimilarity score. Embodiments herein recognize that the Doppler shift for an AA to base station connection (at current or predicted future location of the AA) can be in dependence on a spatial relationship between the base station and AA 130. Accordingly, location and direction information of an AA (current or predicted location) can be used to return a Doppler shift (alternatively Doppler shift measurement can include comparing observed frequencies of received radio signals). For example, a perpendicular dissimilarity score for a location and direction of an AA in respect to a plurality of candidate base stations can be examined and used as a surrogate measurement of Doppler shift. Embodiments herein recognize that locations and directions that are more perpendicular in respect to a base station tend to produce smaller Doppler shifts.

Manager system 110 for returning a Doppler shift for a connection between an AA and a candidate base station can according to one embodiment multiply the cosine of the first angle as defined above by the product of the carrier frequency and the AA's speed, divided by the speed of light. The Doppler shift for a connection between an AA to a certain base station can be computed by projecting predicted velocity along the position vector between that base station and the AA's predicted location, dividing it by the speed of light and multiplying the result by the carrier frequency.

Determining that a base station handoff triggering criterion has been satisfied at block 1104 can include manager system 110 determining that a prospective connection of AA 130 to a certain base station of base stations 120A-120Z is characterized by having a Doppler shift parameter value within a threshold and a highest signal strength of prospective connections having Doppler shifts of within a threshold. There is set forth herein, according to one embodiment, examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining, wherein the criterion is that a prospective connection of the mobile airborne article to a certain of the first through Nth base stations is characterized by having a Doppler shift parameter value of within a threshold, and a highest signal strength of prospective base station connections of AA 130 having Doppler shifts of within the threshold, and wherein the initiating handoff includes initiating handoff to the certain of the first through Nth base stations.

Determining that a base station handoff triggering criterion has been satisfied at block 1104 can include manager system 110 determining that a prospective connection of AA 130 to a certain base station of base stations 120A-120Z exceeds a signal strength threshold and includes a lowest Doppler shift of prospective connections having signal strengths exceeding the threshold. There is set forth herein, according to one embodiment, examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining, wherein the criterion is that a prospective connection of the mobile airborne article to a certain of the first through Nth base stations is characterized by having signal strength exceeding a threshold, and a lowest Doppler shift among prospective base station connections of AA 130 having signal strengths exceeding the threshold, and wherein the initiating handoff includes initiating handoff to the certain of the first through Nth base stations.

Manager system 110 at decision block 1105 can decide whether handoff triggering has been triggered and if not can return to block 1101 to iteratively receive the next iteration of signal strength data and/or location data received at block 1101. Manager system 110 at block 1105 can decide whether the handoff triggering criterion has been satisfied at block 1104. If a handoff triggering criterion has been satisfied at block 1104, manager system 110 at block 1105 can proceed to initiate a handoff. Manager system 110 for initiating handoff to a next base station of a succession of base stations can proceed to block 1106. Manager system 110 on completion of send block 1106 can return to block 1101.

At block 1106 manager system 110 can send handoff directive data to the CSBS for facilitating handoff to a selected next base station identified by performing the determining block 1104. Manager system 110 at block 1104, can select a next serving base station (NSBS).

In the case there is a changed base station, manager system 110 at block 1106 can send for receipt by the CSBS at block 1205 handoff directive data directing the CSBS to perform operations for handoff of the connection of the CSBS to AA 130 to the next serving base station (NSBS). In response to receipt of handoff directive data at block 1205, the CSBS can perform a handoff procedure resulting in AA 130 terminating its connection with the CSBS and establishing a connection with a next serving base station (NSBS). The NSBS at connect block 1207 and the AA 130 at block 1307 can engage in communications to facilitate a connection therebetween.

In response to successful connection at block 1306, the status of the NSBS transitions to CSBS and AA 130 can proceed to block 1308. At block 1308, AA 130 can return to block 1301 wherein AA 130 is iteratively receiving and processing reference signals from a plurality of base stations 120A-120Z. In response to completion of a connection at blocks 1207 and 1307, the NSBS (transitioned to CSBS) can send to AA 1330 an updated list of base stations, the updated list of base stations being base stations that neighbor the newly transitioned CSBS rather than the prior CSBS. At block 1301 in response to a handoff between base stations completed at blocks 1207 and 1307, AA 130 can process reference signals sent by all base stations in its range including the base stations specified in the updated list of base stations.

In a second iteration (and subsequent iterations) of the loop comprising 1301-1305, AA 130 can bypass blocks 1302-1304 at decision block 1302 and proceed directly to block 1305 to send to the CSBS at block 1305 for receipt by the current CSBS at block 1203 signal strength data and/or location data. Completion of block 1206 the NSBS transitions to become a CSBS. Response to receipt of data at block 1203 the CSBS sends at block 1204 various data, e.g. signal strength and/or location data to manager system 110 for receipt at block 1101. Manager system 110 can responsively thereto perform a next iteration of blocks 1101-1106. It is therefore seen that manager system 110 can iteratively perform blocks 1101-1106 to facilitate iterative handoffs to a sequence of NSBSs.

Figure 6:
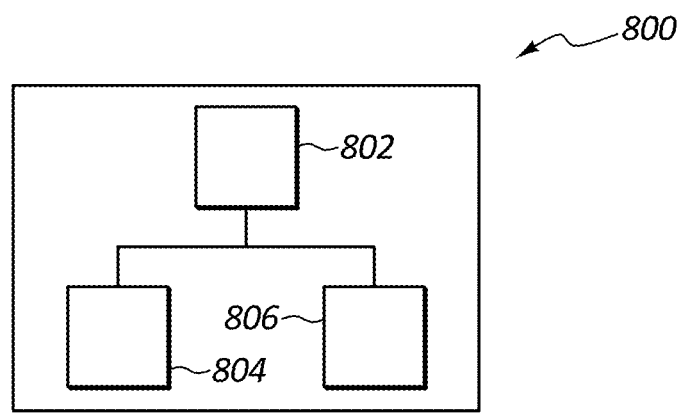
FIG. 6 depicts a computer system according to one embodiment.

Computer System. Processes described herein may be performed by one or more computer systems or other processing devices, as provided, in a server as set forth herein. An example computer system to incorporate and use aspects described herein is depicted and described with reference to FIG. 6. Computer system 800 includes one or more processors 802, memory 804, and one or more I/O devices 806, which may be coupled to each other by busses and other electrical hardware elements (not depicted). Processor(s) 802 include any appropriate hardware component(s) capable of implementing functions, for instance executing instruction(s) (sometimes alternatively referred to as code, firmware and/or software) retrieved from memory 804. Execution of the instructions causes the computer system 800 to perform processes, functions, or the like, described herein with reference to the methods set forth herein, e.g. methods for facilitating handoff of connections to a next base station. One or more computer system configured according to computer system 800 can host one or more virtual machine (VM) as set forth herein.

In some examples, aspects described herein are performed by a plurality of homogenous or heterogeneous computer systems coordinated to collectively perform processes, functions, or the like.

Memory 804 includes hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 804 may be volatile, non-volatile, or a combination of the two. As a specific example, memory 804 includes one or more hard drives and one or more random-access memory (RAM) devices for, respectively, non-volatile and volatile storage of data. Example programs stored by memory include an operating system and applications that run on the operating system, such as specialized applications to perform functions described herein.

I/O device(s) 806 include hardware and/or software components that support input and output of data to/from computer system 800. I/O device(s) 806 include physical components that attach physically or wirelessly to the computer system and/or integrate into the computer system, such as keyboards, mice, display devices, joysticks, camera devices, compact disks, thumb drives, printers, global positioning system (GPS) devices, gyroscopes, magnetometers, light sensors, proximity sensors, microphones, speakers, or accelerometers, as examples. I/O devices 806 also include, but are not limited to, I/O controllers and hardware and software supporting data communication with the aforementioned components, such as network, graphics, and/or audio controller(s). An example I/O device 806 is a network adapter for communication of data between computer system 800 and another component, such as another computer system, across communication links. Examples include Ethernet, cable, WiFi, cellular and/or fiber-based communications links passing data packets between computer system 800 and other systems across one or more networks, such as the Internet. Other example I/O devices 806 include universal serial bus (USB), peripheral component interconnect (PCI), and serial adapters/interfaces configured to couple to devices of their respective kind.

A non-limiting list of example computer systems includes: personal computers (PCs), laptops, workstations, servers, mainframes, network appliances, virtualization devices, computing terminals, personal digital assistants, cellular telephones and smartphones, wearable devices ("wearables"), tablet computers, and sensors such as cameras or camera systems.

Figure 7:
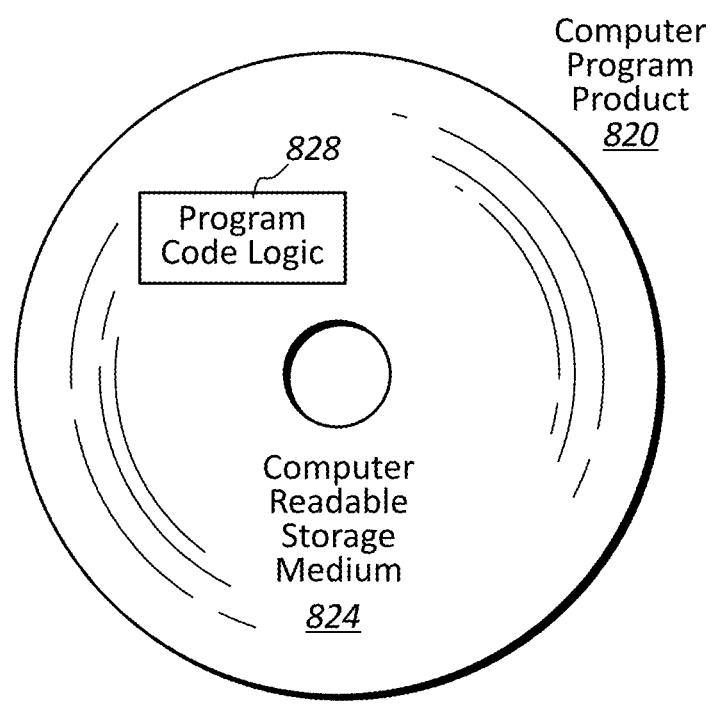
FIG. 7 depicts a computer program product according to one embodiment.

Accordingly, aspects described herein may take the form of one or more systems, methods/processes, and/or a computer program products. A computer program product may be a computer-readable, tangible storage medium or device that stores instructions. In some embodiments, the computer program product is non-transitory computer readable storage media. Referring to FIG. 7, an example computer program product 820 is depicted that includes, for instance, one or more computer readable storage media 824 to store computer-readable program code means, logic and/or instructions 828 thereon to provide and facilitate one or more embodiments described herein.

A computer-readable storage medium can be, as examples, electronic, magnetic, electromagnetic, optical, and/or semi-conductor-based. Examples include but are not limited to: random access memory, read-only memory, computer disks, flash memory, and optical storage media like compact disks (CDs) or digital versatile disks (DVDs). As specifically used herein, computer-readable storage media does not per se consist of transitory signals, such as radio waves or other propagating signals.

Program code contained or stored in/on a computer readable storage medium can be obtained and executed by a computer system (computer, processing system, data processing system, etc. including a component thereof) and/or other device to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C #, Java, etc. Program code may execute entirely or partially on the computer system, a remote computer system, or a combination of partially on the computer system and partially on a remote computer system.

Program code can include program instructions obtained for execution by processor(s). Computer program instructions may be provided to processor(s) of, e.g., a computer system, to produce a machine, such that the program instructions, when executed by the processor(s), perform, achieve, or facilitate aspects described herein, such as actions, processes, or functions described herein. Such functions can be implemented, in some embodiments, by computer program instructions. Behaviors/functions specified or performed by functions set forth herein may occur in a different order than depicted and/or described, or may occur simultaneous to, or partially/wholly concurrent with, one or more other functions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions such as the functions set forth herein.

There is set forth herein in one embodiment: a computer program product comprising: a computer readable storage medium readable by one or more processing circuit and storing instructions for execution by one or more processor for performing a method comprising: predicting a future location of a mobile airborne article; examining using the predicted future location one or more parameter characterizing a prospective connection of the mobile airborne article to first through Nth base stations; determining based on the examining that a criterion is satisfied, the criterion having one or more factor; initiating handoff of the mobile airborne article to one of the first through Nth base stations based on the determining. There is set forth herein in one embodiment: a computer program product comprising: a computer readable storage medium readable by one or more processing circuit and storing instructions for execution by one or more processor for performing a method comprising: examining one or more parameter characterizing a prospective connection of a mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: examining one or more parameter characterizing a prospective connection of the mobile airborne article to first through nth base stations, the one or more parameter including a Doppler shift; determining based on the examining that a criterion is satisfied, the criterion having one or more factor; and initiating handoff of the mobile airborne article to one of the first through nth base stations based on the determining. Other embodiments of this aspect include corresponding computer systems, apparatus, and computer programs recorded on one or more computer storage devices, each configured to perform the actions of the methods.

Implementations may include one or more of the following features. The method where the one or more parameter includes a signal strength parameter. The method where determination of the Doppler shift parameter includes determination of a perpendicularity dissimilarity parameter, where the method includes calculating for each of a plurality of prospective connections of the mobile airborne article the first through nth base stations a perpendicularity dissimilarity parameter based on an angle between a prospectively connected base station and a current heading of the mobile airborne article. The method where determination of the Doppler shift parameter includes determination of a perpendicularity dissimilarity parameter, where the method includes calculating for each of a plurality of prospective connections of the mobile airborne article to base stations of the first through nth base stations a perpendicularity dissimilarity parameter based on an angle between a prospectively connected base station and a predicted future heading of the mobile airborne article. The method where the criterion is that a prospective connection of the mobile airborne article to a certain base station of the first through nth base stations is characterized by having a Doppler shift parameter of within a threshold, and a highest signal strength of prospective connections having Doppler shifts of within the threshold, and where the initiating handoff includes initiating handoff to the certain base station of the first through nth base stations. The method where the criterion is that a prospective connection of the mobile airborne article to a certain base station of the first through nth base stations is characterized by having a signal strength of above a threshold, and a lowest Doppler shift of prospective connections having signal strengths of above the threshold, and where the initiating handoff includes initiating handoff to the certain base station of the first through nth base stations. The method where the method includes predicting a future location of the mobile airborne article, where the examining includes using a result of the predicting and where the predicting includes using a predicting function based on spline functions. Implementations of the described techniques may include hardware, a method or process, or computer software on a computer-accessible medium.

One general aspect includes a method including: predicting a future location of a mobile airborne article; examining using the predicted future location one or more parameter characterizing a prospective connection of the mobile airborne article to first through nth base stations; determining based on the examining that a criterion is satisfied, the criterion having one or more factor; and initiating handoff of the mobile airborne article to one of the first through nth base stations based on the determining. Other embodiments of this aspect include corresponding computer systems, apparatus, and computer programs recorded on one or more computer storage devices, each configured to perform the actions of the methods.

Implementations may include one or more of the following features. The method where the one or more parameter includes a signal strength parameter. The method where the one or more parameter includes a signal strength parameter provided by an SINR parameter value. The method where the one or more parameter includes a Doppler shift parameter. The method where the one or more parameter includes a perpendicularity dissimilarity score parameter. The method where determination of the Doppler shift parameter includes determination of a perpendicularity dissimilarity parameter, where the method includes calculating for each of a plurality of prospective connections of the mobile airborne article to base stations of the first through nth base stations a perpendicularity dissimilarity parameter based on an angle between a prospectively connected base station and a predicted future heading of the mobile airborne article. The method where the one or more parameter includes a signal strength parameter, and where the signal strength parameter includes one or more of the following selected from the group including of an RSSI parameter and an SINR parameter, and where the method includes iteratively repeating the predicting, the examining, the determining and the initiating so that the mobile airborne article is handed off to a succession of base stations of the first through nth base stations, and where the mobile airborne article includes one or more of the following selected from the group including of a user equipment device and an aircraft. The method where the one or more parameter includes a Doppler shift parameter and a signal strength parameter. The method where the one or more parameter includes a perpendicularity dissimilarity score parameter and a signal strength parameter. The method where the criterion is that a prospective connection of the mobile airborne article to a certain of the first through nth base stations is characterized by having a Doppler shift parameter of within a threshold, and a highest signal strength of prospective connections having Doppler shifts of within the threshold, and where the initiating handoff includes initiating handoff to the certain of the first through nth base stations. The method where the criterion is that a prospective connection of the mobile airborne article to a certain base station of the first through nth base stations is characterized by having a signal strength of above a threshold, and a lowest Doppler shift of prospective connections having signal strengths of above the threshold, and where the initiating handoff includes initiating handoff to the certain base station of the first through nth base stations. The method where the predicting includes using a predicting function based on spline functions. Implementations of the described techniques may include hardware, a method or process, or computer software on a computer-accessible medium.

One general aspect includes a computer program product including: a computer readable storage medium readable by one or more processing circuit and storing instructions for execution by one or more processor for performing a method including: examining one or more parameter characterizing a prospective connection of the mobile airborne article to first through nth base stations, the one or more parameter including a Doppler shift; determining based on the examining that a criterion is satisfied, the criterion having one or more factor; and initiating handoff of the mobile airborne article to one of the first through nth base stations based on the determining. Other embodiments of this aspect include corresponding computer systems, apparatus, and computer programs recorded on one or more computer storage devices, each configured to perform the actions of the methods.

[The following section is taken from U.S. Application No. 62/535,454, filed Jul. 21, 2017 incorporated herein by reference].

Methods, computer program products, and systems, are set forth herein which can include in one embodiment: examining one or more parameter characterizing a prospective connection of the mobile airborne article to first through Nth base stations, the one or more parameter including a Doppler shift; determining based on the examining that a criterion is satisfied, the criterion having one or more factor;

and initiating handoff of the mobile airborne article to one of the first through Nth base stations based on the determining.

Methods, computer program products, and systems, are set forth herein which can include in one embodiment: predicting a future a location of a mobile airborne article; examining using the predicted future location one or more parameter characterizing a prospective connection of the mobile airborne article to first through Nth base stations; determining based on the examining that a criterion is satisfied, the criterion having one or more factor; initiating handoff of the mobile airborne article to one of the first through Nth base stations based on the determining.

In one embodiment the one or more parameter can include a signal strength parameter. In one embodiment the one or more parameter can include a signal strength parameter provided by an SINR parameter value. In one embodiment the one or more parameter can include a Doppler shift parameter. In one embodiment the one or more parameter can include a perpendicularity dissimilarity parameter. In one embodiment the one or more parameter can include a signal strength parameter. In one embodiment the one or more parameter can include a Doppler shift parameter and a signal strength parameter. In one embodiment the one or more parameter can include a perpendicularity dissimilarity parameter and a signal strength parameter. In one embodiment the criterion is that a prospective connection of the mobile airborne article to a certain of the first through Nth base stations is characterized by having a Doppler shift parameter of within a threshold, and a highest signal strength of prospective connections having Doppler shifts of the within the threshold, and wherein the initiating handoff can include initiating handoff to the certain of the first through Nth base stations. In one embodiment the predicting can include using a predicting function based on "spline" functions.

A small sample of methods, computer program products, and systems set forth herein includes the following. A1. A method comprising: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining. A2. The method of A1, wherein the one or more parameter includes a signal strength parameter. A3. The method of A1, wherein determination of the Doppler shift parameter includes determination of a perpendicularity dissimilarity parameter. A4. The method of A1, wherein the criterion is that a prospective connection of the mobile airborne article to a certain base station of the first through Nth base stations is characterized by having a Doppler shift parameter of within a threshold, and a highest signal strength of prospective connections having Doppler shifts of within the threshold, and wherein the initiating handoff includes initiating handoff to the certain base station of the first through Nth base stations. A5. The method of A1, wherein the predicting includes using a predicting function based on "spline" functions. B1. A method comprising: predicting a future a location of a mobile airborne article; examining using the predicted future location one or more parameter characterizing a prospective connection of the mobile airborne article to first through Nth base stations; determining based on the examining that a criterion is satisfied, the criterion having one or more factor; and initiating handoff of the mobile airborne article to one of the first through Nth base stations based on the determining. B2. The method of B1, wherein the one or more parameter includes a signal strength parameter. B3. The method of B1, wherein the one or more parameter includes a signal strength parameter provided by an SINR parameter value. B4. The method of B1, wherein the one or more parameter includes a Doppler shift parameter. B5. The method of B1, wherein the one or more parameter includes a perpendicularity dissimilarity score parameter. B6. The method of B1, wherein the one or more parameter includes a signal strength parameter. B7. The method of B1, wherein the one or more parameter includes a Doppler shift parameter and a signal strength parameter. B8. The method of B1, wherein the one or more parameter includes a perpendicularity dissimilarity score parameter and a signal strength parameter. B9. The method of B1, wherein the criterion is that a prospective connection of the mobile airborne article to a certain of the first through Nth base stations is characterized by having a Doppler shift parameter of within a threshold, and a highest signal strength of prospective connections having Doppler shifts of within the threshold, and wherein the initiating handoff includes initiating handoff to the certain of the first through Nth base stations. B10. The method of B1, wherein the predicting includes using a predicting function based on "spline" functions. C1. A computer program product comprising: a computer readable storage medium readable by one or more processing circuit and storing instructions for execution by one or more processor for performing a method comprising: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining. D1. A system comprising: a memory; at least one processor in communication with memory; and program instructions executable by one or more processor via the memory to perform a method comprising: examining one or more parameter characterizing a prospective connection of the mobile airborne article to first through Nth base stations, the one or more parameter including a Doppler shift; determining based on the examining that a criterion is satisfied, the criterion having one or more factor; and initiating handoff of the mobile airborne article to one of the first through Nth base stations based on the determining. E1. A computer program product comprising: a computer readable storage medium readable by one or more processing circuit and storing instructions for execution by one or more processor for performing a method comprising: predicting a future a location of a mobile airborne article; examining using the predicted future location one or more parameter characterizing a prospective connection of the mobile airborne article to first through Nth base stations; determining based on the examining that a criterion is satisfied, the criterion having one or more factor; and initiating handoff of the mobile airborne article to one of the first through Nth base stations based on the determining. F1. A system comprising: a memory; at least one processor in communication with memory; and program instructions executable by one or more processor via the memory to perform a method comprising: predicting a future a location of a mobile airborne article; examining using the predicted future location one or more parameter characterizing a prospective connection of the mobile airborne article to first through Nth base stations; determining based on the examining that a criterion is satisfied, the criterion having one or more factor;

and initiating handoff of the mobile airborne article to one of the first through Nth base stations based on the determining.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. The term "based on" herein can encompass relationships wherein an element is partially based on as well as relationships wherein an element is entirely based on. Furthermore, a device or structure or method that is configured in a certain way is configured in at least that way, but may also be configured in ways that are not listed. Furthermore, a device or structure or method described as having a certain number of elements can be practiced with less than or greater than the certain number of elements.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    examining one or more parameter characterizing a prospective connection of a mobile airborne article to first through Nth base stations, the one or more parameter including a Doppler shift parameter, wherein the examining one or more parameter characterizing a prospective connection of a mobile airborne article to first through Nth base stations is performed by a ground based network that iteratively receives from the mobile airborne article location data of the mobile airborne article over time, and uses the location data of the mobile airborne article over time to ascertain a Doppler shift of the mobile airborne article with reference to respective ones of the first through Nth base stations;
    determining based on the examining that a criterion is satisfied, the criterion having one or more factor, wherein satisfaction of the criterion is in dependence on an amplitude of the Doppler shift parameter; and
    initiating handoff of the mobile airborne article to one of the first through Nth base stations based on the determining.

2. The method of claim 1, wherein the one or more parameter includes a signal strength parameter.

3. A method comprising:
    examining one or more parameter characterizing a prospective connection of a mobile airborne article to first through Nth base stations, the one or more parameter including a Doppler shift, wherein the examining one or more parameter characterizing a prospective connection of a mobile airborne article to first through Nth base stations is performed by a ground based network that iteratively receives from the mobile airborne article location data of the mobile airborne article over time, and uses the location data of the mobile airborne article over time to ascertain a Doppler shift of the mobile airborne article with reference to respective ones of the first through Nth base stations;
    determining based on the examining that a criterion is satisfied, the criterion having one or more factor; and
    initiating handoff of the mobile airborne article to one of the first through Nth base stations based on the determining.

4. The method of claim 3, wherein determination of the Doppler shift parameter includes determination of a perpendicularity dissimilarity parameter, wherein the method includes calculating for each of a plurality of prospective connections of the mobile airborne article to the first through Nth base stations a perpendicularity dissimilarity parameter based on an angle between a prospectively connected base station and a predicted future Heading of the mobile airborne article.

5. The method of claim 1, wherein the criterion is that a prospective connection of the mobile airborne article to a certain base station of the first through Nth base stations is characterized by having a Doppler shift parameter within a threshold, and a highest signal strength of prospective connections having Doppler shifts of within the threshold, and wherein the initiating handoff includes initiating handoff to the certain base station of the first through Nth base stations.

6. The method of claim 1, wherein the criterion is that a prospective connection of the mobile airborne article to a certain base station of the first through Nth base stations is characterized by having a signal strength of above a threshold, and a lowest Doppler shift of prospective connections having signal strengths of above the threshold, and wherein the initiating handoff includes initiating handoff to the certain base station of the first through Nth base stations.

7. The method of claim 1, wherein the method includes predicting a future location of the mobile airborne article, wherein the examining includes using a result of the predicting and wherein the predicting includes using a predicting function based on "spline" functions.

8. A computer program product comprising: a computer readable storage medium readable by one or more processing circuit and storing instructions for execution by one or more processor for performing a method comprising: examining one or more parameter characterizing a prospective connection of a mobile airborne article to first through Nth base stations, the one or more parameter including a Doppler shift, wherein the examining one or more parameter characterizing a prospective connection of a mobile airborne article to first through Nth base stations is performed by a ground based network that iteratively receives from the mobile airborne article location data of the mobile airborne article over time, and uses the location data of the mobile airborne article over time to ascertain a Doppler shift of the mobile airborne article with reference to respective ones of the first through Nth base stations; determining based on the examining that a criterion is satisfied, the criterion having one or more factor; and initiating handoff of the mobile airborne article to one of the first through Nth base stations based on the determining.

9. The method of claim 1, wherein the one or more parameter characterizing a prospective connection of a mobile airborne article to first through Nth base stations has been obtained from an antenna link of a UE device of the mobile airborne article through which antenna link the UE device sends and receives transmissions to and from a currently connected base station.

10. The method of claim 1, wherein the examining one or more parameter characterizing a prospective connection of a mobile airborne article to first through Nth base stations includes examining one or more parameter characterizing a prospective connection of a mobile airborne article to multiple different base stations that are not currently connected to the mobile airborne article.

11. The method of claim 1, wherein the one or more parameter characterizing a prospective connection of a mobile airborne article to first through Nth base stations has been obtained from an antenna link of a UE device of the mobile airborne article through which antenna link the UE device sends and receives transmissions to and from a currently connected base station, wherein the examining one or more parameter characterizing a prospective connection of a mobile airborne article to first through Nth base stations includes examining one or more parameter characterizing a prospective connection of a mobile airborne article to multiple different base stations that are not currently connected to the mobile airborne article.

12. The method of claim 3, wherein determination of the Doppler shift parameter includes determination of a perpendicularity dissimilarity parameter, wherein the method includes calculating for each of a plurality of prospective connections of the mobile airborne article to the first through Nth base stations a perpendicularity dissimilarity parameter based on an angle between a prospectively connected base station and a current Heading of the mobile airborne article.

13. The method of claim 3, wherein the criterion is that a prospective connection of the mobile airborne article to a certain base station of the first through Nth base stations is characterized by having a Doppler shift parameter of within a threshold, and a highest signal strength of prospective connections having Doppler shifts within the threshold, and wherein the initiating handoff includes initiating handoff to the certain base station of the first through Nth base stations.

14. The method of claim 3, wherein the criterion is that a prospective connection of the mobile airborne article to a certain base station of the first through Nth base stations is characterized by having a signal strength above a threshold, and a lowest Doppler shift of prospective connections having signal strengths above the threshold, and wherein the initiating handoff includes initiating handoff to the certain base station of the first through Nth base stations.

15. The method of claim 3, wherein the method includes predicting a future location of the mobile airborne article, wherein the examining includes using a result of the predicting and wherein the predicting includes using a predicting function based on "spline" functions.

16. The method of claim 3, wherein the one or more parameter characterizing a prospective connection of a mobile airborne article to first through Nth base stations has been obtained from an antenna link of a UE device of the mobile airborne article through which antenna link the UE device sends and receives transmissions to and from a currently connected base station.

17. The method of claim 3, wherein the examining one or more parameter characterizing a prospective connection of a mobile airborne article to first through Nth base stations includes examining one or more parameter characterizing a prospective connection of a mobile airborne article to multiple different base stations that are not currently connected to the mobile airborne article.

18. The method of claim 3, wherein the one or more parameter characterizing a prospective connection of a mobile airborne article to first through Nth base stations has been obtained from an antenna link of a UE device of the mobile airborne article through which antenna link the UE device sends and receives transmissions to and from a currently connected base station, wherein the examining one or more parameter characterizing a prospective connection of a mobile airborne article to first through Nth base stations includes examining one or more parameter characterizing a prospective connection of a mobile airborne article to multiple different base stations that are not currently connected to the mobile airborne article.

19. The method of claim 3, wherein satisfaction of the criterion is in dependence on an amplitude of the Doppler shift.

20. The computer program product of claim 8, wherein satisfaction of the criterion is in dependence on an amplitude of the Doppler shift.

\* \* \* \* \*